United States Patent
Mamo

(10) Patent No.: US 11,322,051 B2
(45) Date of Patent: May 3, 2022

(54) UNIVERSAL TAMPER-EVIDENT SECURITY LABEL FOR AN ELECTRONIC DEVICE HAVING AN INTEGRAL CAMERA

(71) Applicant: David F. Mamo, Milford, MI (US)

(72) Inventor: David F. Mamo, Milford, MI (US)

(73) Assignee: PICpatch, LLC, Milford, MI (US)

( * ) Notice: Subject to any disclaimer, the term of this patent is extended or adjusted under 35 U.S.C. 154(b) by 56 days.

(21) Appl. No.: 15/212,805

(22) Filed: Jul. 18, 2016

(65) Prior Publication Data

US 2017/0018208 A1     Jan. 19, 2017

Related U.S. Application Data

(60) Provisional application No. 62/194,248, filed on Jul. 19, 2015.

(51) Int. Cl.
*G09F 3/00* (2006.01)
*B32B 7/12* (2006.01)
(Continued)

(52) U.S. Cl.
CPC ............ *G09F 3/0292* (2013.01); *B32B 7/06* (2013.01); *B32B 7/12* (2013.01); *G09F 3/0329* (2013.01); *G09F 3/10* (2013.01); *G09F 3/208* (2013.01); *G09F 9/30* (2013.01); *H04M 1/0264* (2013.01); *B32B 2307/748* (2013.01); *B32B 2519/00* (2013.01); *B32B 2559/00* (2013.01)

(58) Field of Classification Search
CPC ..... G09F 2003/0276; G09F 2003/0277; G09F 3/03; C09J 2203/334; C09J 2203/338
See application file for complete search history.

(56) References Cited

U.S. PATENT DOCUMENTS 5,411,295 A      5/1995   Bates et al.
5,976,014 A  *  11/1999   Petrick .................. B42D 5/023
                                                                281/2
(Continued)

OTHER PUBLICATIONS 800, posted at mediprintinguk.co.uk, posted on May 25, 2019, site visited Feb. 18, 2022. online, available from internet https://tineye.com/search/cece8d54a 1385899859f0691594cc00db3be86e5?sort=crawl_date&order=asc&page= 1 (Year: 2019).

(Continued)

*Primary Examiner* — Laura C Powers
(74) *Attorney, Agent, or Firm* — Edmund P. Anderson; North Star IP Law PLLC

(57) ABSTRACT

A universal security label for an electronic device comprising an integral camera lens. The label includes a plastic film security label body, the security label body comprising a plurality of layers, a top surface and an adhesive base, the security label body having a width and a length, the length substantially greater than the width and sufficient to wrap and adhere the label body completely around a portion of the electronic device and over the camera lens, the adhesive base of an overlapping end of the label body configured to adhere to the top surface of another portion of the label body, the layers having tamper-evident feature such that once the adhesive base is adhered to the top surface, subsequent removal provides an indication of its removal through the top surface of the overlapping end.

20 Claims, 3 Drawing Sheets

(51) Int. Cl.
  *B32B 7/06* (2019.01)
  *G09F 3/10* (2006.01)
  *G09F 9/30* (2006.01)
  *G09F 3/03* (2006.01)
  *G09F 3/20* (2006.01)
  *H04M 1/02* (2006.01)

(56) References Cited

U.S. PATENT DOCUMENTS

| | | | |
|---|---|---|---|
| 6,372,341 B1* | 4/2002 | Jung | G09F 3/0292 |
| | | | 428/354 |
| 6,537,634 B2* | 3/2003 | Otten | B65D 63/1009 |
| | | | 428/201 |
| 7,594,348 B2* | 9/2009 | Oosterlinck | G09F 3/0289 |
| | | | 229/102 |
| 11,238,759 B1 | 2/2022 | Staudinger et al. | |
| 2004/0244242 A1* | 12/2004 | Maliner | G09F 3/02 |
| | | | 40/310 |
| 2005/0230961 A1 | 10/2005 | Walley | |
| 2007/0071968 A1* | 3/2007 | Hermony | C09J 7/29 |
| | | | 428/343 |
| 2007/0130811 A1* | 6/2007 | Shevelev | B65D 55/0818 |
| | | | 40/312 |
| 2008/0308613 A1 | 12/2008 | Freder | |
| 2010/0043694 A1 | 2/2010 | Patel | |
| 2010/0285398 A1 | 11/2010 | Hogerton et al. | |
| 2011/0151204 A1* | 6/2011 | Lien | G09F 3/0292 |
| | | | 428/195.1 |
| 2012/0096751 A1 | 4/2012 | Ray, III et al. | |
| 2017/0018208 A1 | 1/2017 | Mamo | |
| 2017/0305630 A1 | 10/2017 | Miller | |
| 2020/0090553 A1 | 3/2020 | Vanslette | |
| 2020/0111389 A1 | 4/2020 | Curnew et al. | |
| 2021/0396749 A1 | 12/2021 | Hennessey et al. | |
| 2022/0040955 A1 | 2/2022 | Benedetti et al. | |

OTHER PUBLICATIONS

Transfer tamper evident, posted at amazon.com, posted on Dec. 7, 2018, site visited Feb. 18, 2022. online, available from internet:https://www.amazon.com/dp/B07L65XDGW/ (Year: 2018).

WELSTIK tamper tape, posted at amazon.com, posted on Sep. 24, 2019, site visited Feb. 18, 2022. online, available from internet: https://www.amazon.com/dp/B07Y9CP7HJ (Year: 2019).

* cited by examiner

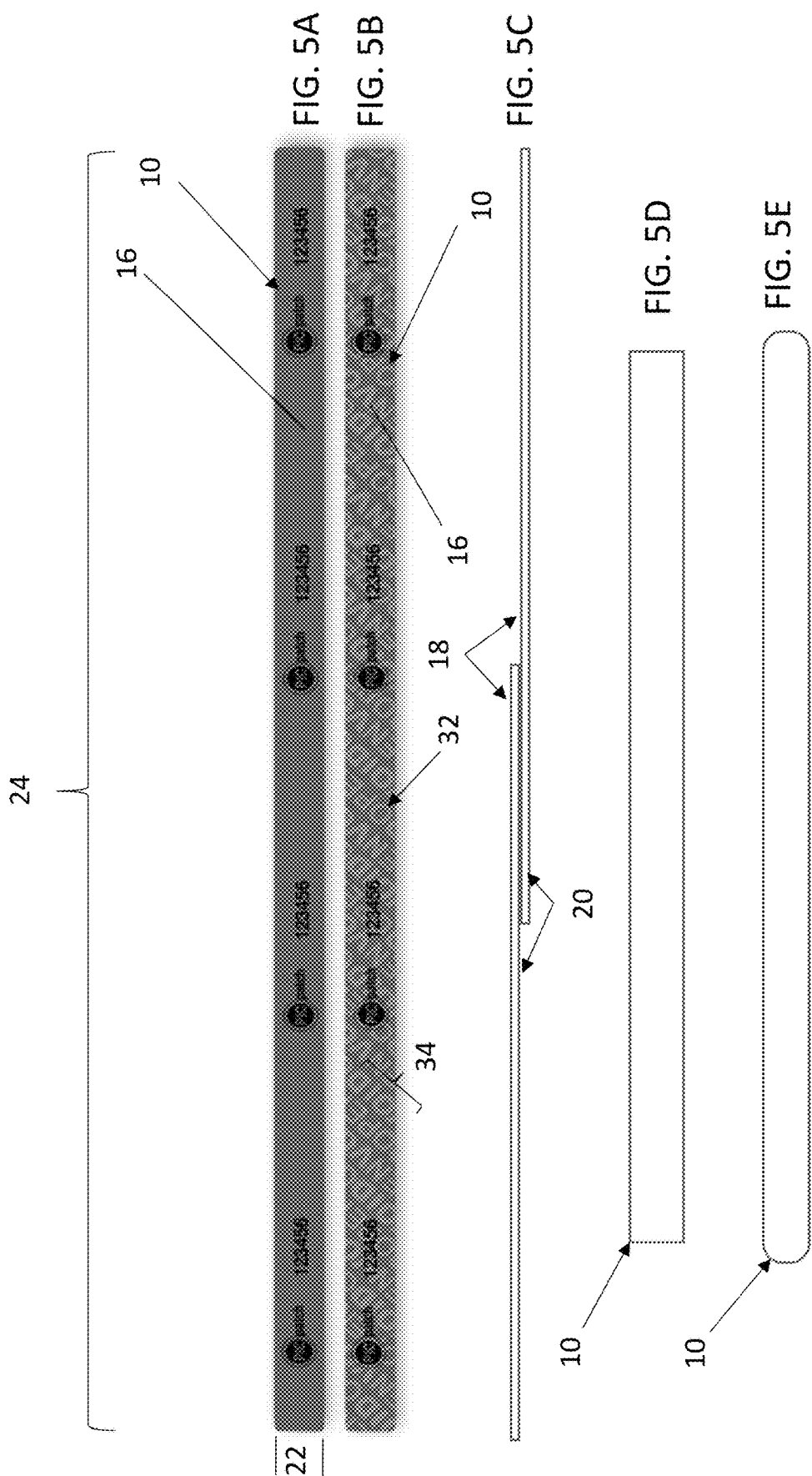

UNIVERSAL TAMPER-EVIDENT SECURITY LABEL FOR AN ELECTRONIC DEVICE HAVING AN INTEGRAL CAMERA

CROSS-REFERENCES TO RELATED APPLICATIONS

This patent application claims priority to U.S. Provisional Patent Application Ser. No. 62/194,248, filed Jul. 19, 2015 which is incorporated herein by reference in its entirety.

TECHNICAL FIELD

Disclosed herein is a universal tamper-resistant, tamper-evident, security label for an electronic device having an integral camera, and more particularly, a universal tamper-resistant, tampe-evident, security label for a smartphone.

BACKGROUND

Camera phone labels, are tamper evident security labels. They are affixed on a surface of the camera over a camera phone's lens to prevent use of the camera, particularly to prevent photos of sensitive items, including items where a photo would provide sensitive, or confidential, or private information about the item. Totally removing, partially removing or even peeling the edges of the label will produce a visual indicator that makes it easy for your security team to quickly identify tampering.

While extremely useful, current camera phone labels are generally sized so that they only cover the camera lens and a small portion of the surface of the phone adjacent to the lens, and are typically on the order of about 0.5 inches wide by about 0.75 inches long. In addition, they are adapted to be attached to the surface of the camera phone proximate the camera lens, and particularly to the glass face of the camera phone.

As camera phones have become more increasingly advanced, particularly with the latest generations of smartphones such as the Apple iPhone 6 and Samsung Galaxy S6, for example, with advanced damage-resistant screens, reduced adherence of the camera phone labels to the glass surface has been observed, reducing the effectiveness of the labels with regard to their tamper-resistant, tamper-evident characteristics.

Therefore, it is very desirable to provide a tamper-resistant, tamper-evident security label that may be used on all of the current generation of smartphones and other electronic devices having an integral camera.

SUMMARY

In an exemplary embodiment, a universal security label for an electronic device comprising an integral camera lens is disclosed. The label includes a plastic film security label body, the security label body comprising a plurality of layers, a top surface and an adhesive base, the security label body having a width and a length, the length substantially greater than the width and sufficient to wrap and adhere the label body completely around a portion of the electronic device and over the camera lens, the adhesive base of an overlapping end of the label body configured to adhere to the top surface of another portion of the label body, the layers having tamper-evident feature such that once the adhesive base is adhered to the top surface, subsequent removal provides an indication of its removal through the top surface of the overlapping end.

BRIEF DESCRIPTION OF THE DRAWINGS

FIGS. 5A and 5B are photograph/schematic illustrations of a tamper-evident security label prior to being applied (FIG. 5A) and in the removed condition after application, wherein the tamper-evident feature is visible through the top surface of the label, as described herein;

FIG. 5C is a schematic illustration of a second embodiment of a security label as described herein comprising at least two labels with the adhesive base of one label adhered and joined to the top surface of another label;

FIG. 5D is a schematic illustration of an embodiment of a security label as described herein comprising a rectangular or substantially rectangular shape as described herein; and FIG. 5E is a schematic illustration of an embodiment of a security label as described herein comprising a rounded rectangular or substantially rounded rectangular shape as described herein.

DETAILED DESCRIPTION

Figure 1:
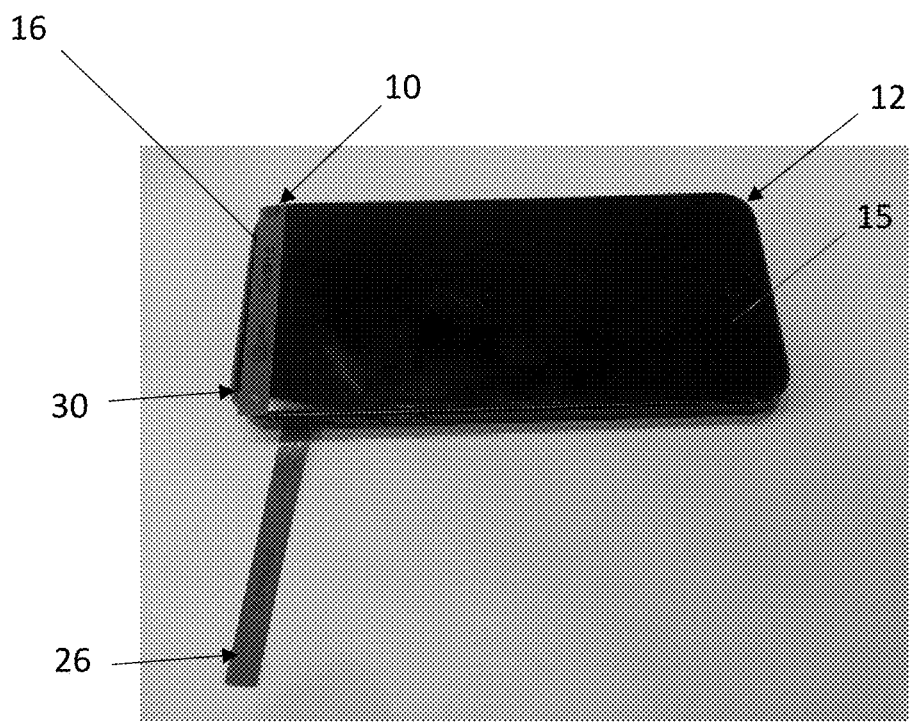
FIG. 1 is a photograph/schematic illustration of an embodiment of a security label as described herein in a partially installed condition prior to overlapping the overlapping end and adhereing it to the top surface of the other end of the label.
Figure 2:
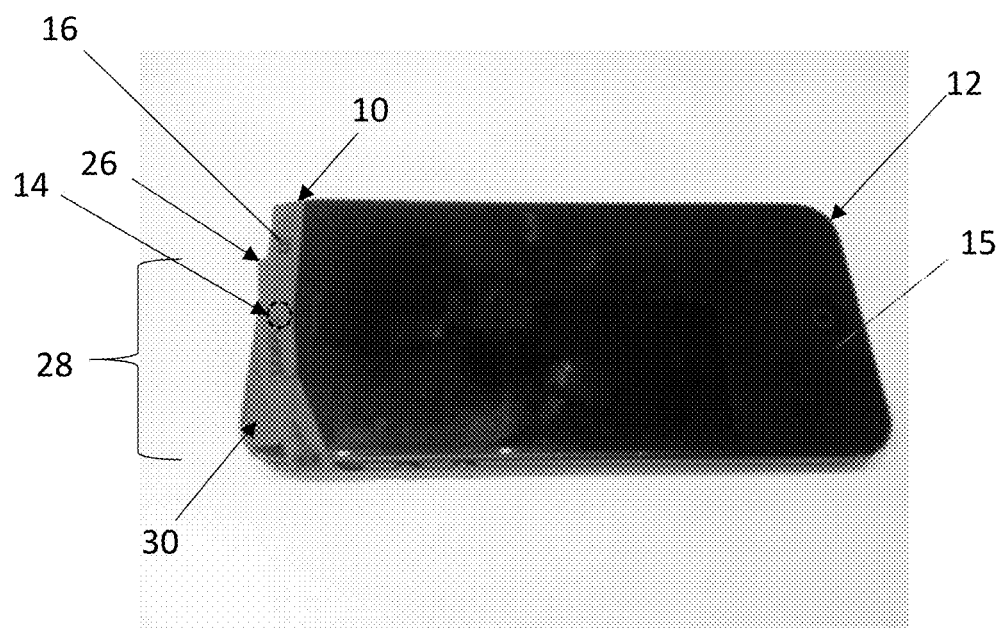
FIG. 2 is a photograph/schematic illustration of an embodiment of a security label as described herein installed after overlapping the overlapping end and adhereing it to the top surface of the other end of the label and representing an installed condition of the label.
Figure 3:
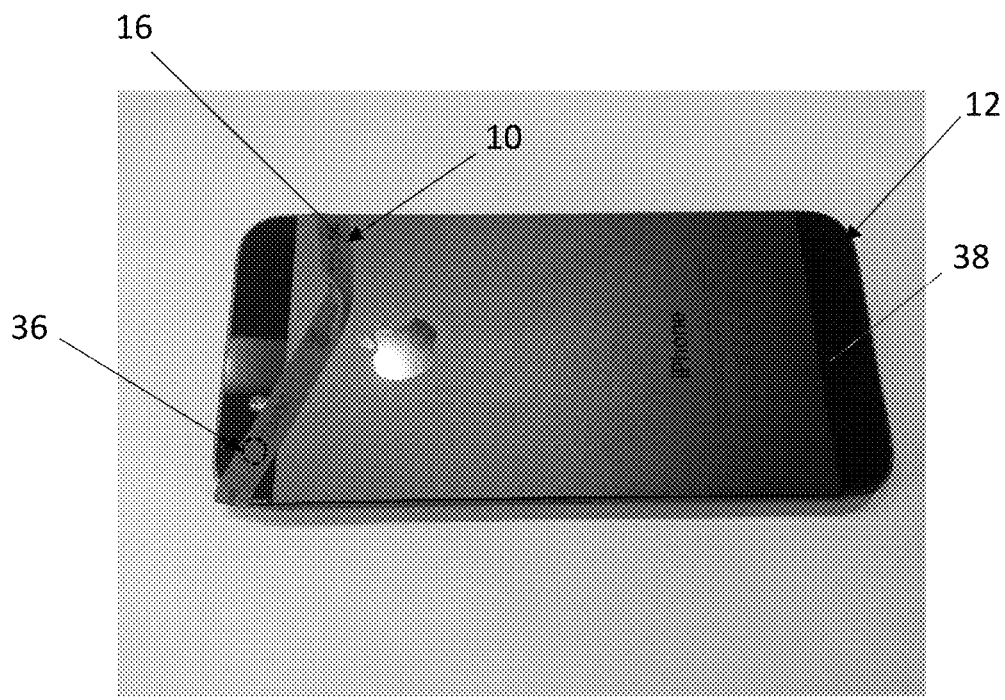
FIG. 3 is a photograph/schematic illustration of the embodiment of FIG. 2 illustrating an opposed second side of the electronic device in the installed condition, wherein the label is covering a second camera lens disposed on the second side of the electronic device.
Figure 4:
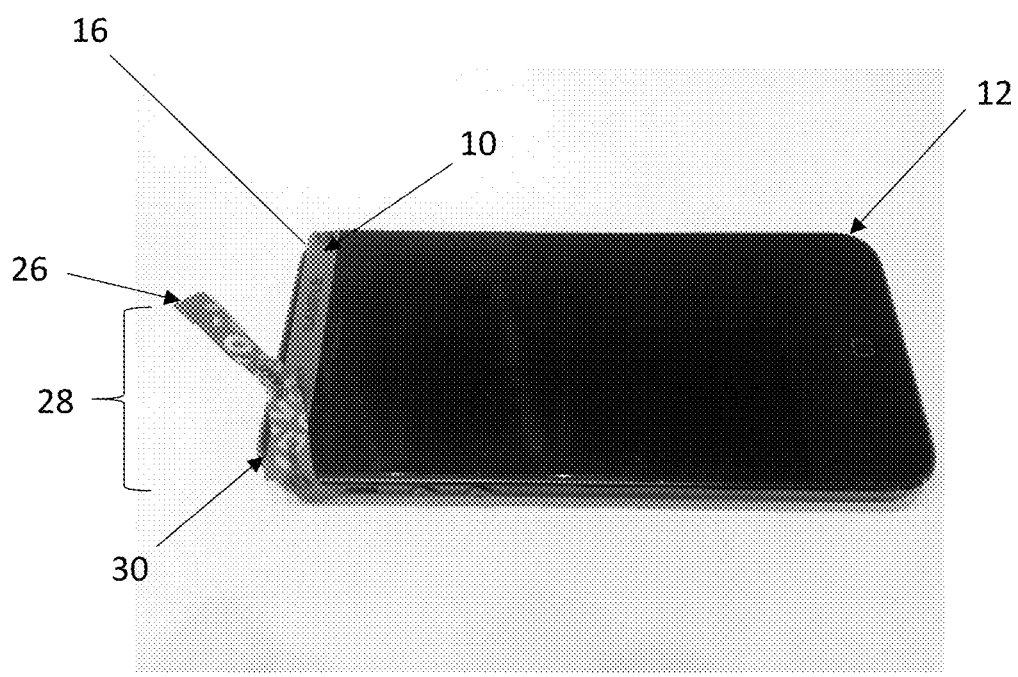
FIG. 4 is a photograph/schematic illustration of the embodiment of FIG. 2 illustrating the label in a partially removed condition, wherein the tamper-evident feature is visible through the top surface of the label.

Referring FIGS. 1-5E, a universal security label 10 for an electronic device 12 comprising an integral camera lens 14 on a side thereof is disclosed that advantageously overcome the limitations of prior art security labels, as described above. The universal security label 10 includes a plastic film security label body 16. The security label body 16 construction includes a plurality of layers as is conventional in the art. The security label body 16 also includes a top surface 18 and an adhesive base 20. The security label body 16 has a width 22 and a length 24, the length 24 substantially greater than the width 22 and the length 24 sufficient to wrap and adhere the security label body 16 completely around a portion of the electronic device 12 and over the camera lens 14 on the first side 15 of electronic device 12 as shown in FIGS. 1-3 to cover the camera lens. The adhesive base 20 of an overlapping end 26 of the label body 16 configured to adhere to the top surface 18 of another portion 28 of the label body 16, such as an opposed end 30. The layers have a conventional tamper-evident feature 32 such that once the adhesive base 20 is adhered to the top surface 18, subsequent removal of the label body 16 provides an indication of its removal through the top surface 18 of the overlapping end 26, and the overlapping end 26 of the label is in a removed condition (FIG. 4).

The universal security label 10 may have any suitable width 22 and length 24. In one embodiment, the width 22 is 0.125 to 0.375 inches, and the length 24 is 6 to 9 inches. In another exemplary embodiment, the width is 0.25 inches, and the length is 7 inches.

The universal security label 10 may have any suitable tamper-evident feature 32. In one embodiment, the tamper-evident feature 32 comprises a word 34, such as "VOID" and/or symbol (not shown) formed within the layers and evident through the top surface 18.

In one embodiment (FIG. 5C), the universal security label 10 further comprises at least two labels 10 with the adhesive base 20 of one label adhered and joined to the top surface 20 of another label, wherein the joined labels have a length that is greater than the length of either label.

In one embodiment, the universal security label 10 has a length 24 of the label body 16 sufficient to wrap entirely around a lateral width (w) of the electronic device 12. In another embodiment, the universal security label 10 has a length 24 of the label body 16 sufficient to wrap entirely around a corner of the electronic device 12.

In one embodiment, the universal security label 10 is configured for use with a smartphone (FIG. 1). In another embodiment, the universal security label 10 is configured for use with an electronic device 10, wherein the device comprises a tablet computer, laptop computer, computer monitor, or television.

In one embodiment, the universal security label 10 may be used with an electronic device 12, such as a smartphone or tablet computer, that includes a second camera lens 36 disposed on an opposed second side 38 of the electronic device 12 as shown in FIG. 3.

In one embodiment, the universal security label 10 has a rectangular or substantially rectangular shape as shown in FIG. 5D. In another embodiment, the universal security label 10 has a rounded rectangular or substantially rounded rectangular shape as shown in FIG. 5E.

The singular forms "a," "an," and "the" include plural referents unless the context clearly dictates otherwise. "Or" means "and/or." The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

The suffix "(s)" is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A universal, electronic device, security label, the electronic device comprising an integral camera lens on a side thereof, comprising: a plastic film security label body, the security label body comprising a plurality of layers, a top surface, an adhesive base, an end, and an opposed end, the security label body having a width and a length that is substantially greater than the width, the length configured and sufficient to wrap and adhere the adhesive base of the label body from the end, completely around a portion of the electronic device, cover the camera lens, and adhere the adhesive base of a portion of the label body in overlapping engagement with the top surface of another portion of the label body, the plurality of layers having a tamper-evident feature comprising a word and/or symbol formed within the layers and evident through the top surface along the entire length of the label body, the tamper-evident feature visible through the top surface of the portion of the label body if the portion of the label body is adhered to and then removed entirely from the top surface of the another portion of the label body.

2. The universal, electronic device, security label of claim 1, wherein the width is 0.125 to 0.375 inches, and the length is 6 to 9 inches.

3. The universal, electronic device, security label of claim 1, wherein the width is 0.25 inches, and the length is 7 inches.

4. The universal, electronic device, security label of claim 1, wherein the security label comprises an extended security label comprising a plurality of joined security labels, each security label comprising the security label body comprising the plurality of the layers, the top surface, the adhesive base, the end, the opposed end, the width, and the length, and wherein the adhesive base of one security label body is adhered and joined to the top surface of another adjacent security label body, wherein the joined security label bodies have a joined length that is greater than the length of any one of the security label bodies.

5. The universal, electronic device, security label of claim 1, wherein the length of the label body is sufficient to wrap entirely around a lateral width of the electronic device.

6. The universal, electronic device, security label of claim 1, wherein the length of the label body is sufficient to wrap entirely around a corner of the electronic device.

7. The universal, electronic device, security label of claim 1, wherein the electronic device comprises a smartphone.

8. The universal, electronic device, security label of claim 1, wherein the electronic device comprises a tablet computer, laptop computer, computer monitor, or television.

9. The universal, electronic device, security label of claim 1, wherein the label has a rectangular shape or a rounded rectangular shape.

10. The universal, electronic device, security label of claim 1, wherein the electronic device comprises an opposed second side having a second camera lens disposed thereon, and wherein the length of the security label body is also configured and sufficient to cover the second lens.

11. A method of making a universal, electronic device, security label, the electronic device comprising an integral camera lens on a side thereof, comprising:

forming a plastic film security label body, the security label body comprising a plurality of layers, a top surface, an adhesive base, an end, and an opposed end, the security label body having a width and a length that is substantially greater than the width, the length configured and sufficient to wrap and adhere the adhesive base of the label body from the end, completely around a portion of the electronic device, cover the camera lens, and adhere the adhesive base of a portion of the label body in overlapping engagement with the top surface of another portion of the label body, the plurality of layers having a tamper-evident feature comprising a word and/or symbol formed within the layers along the entire length of the label body, the tamper-evident feature visible through the top surface of the portion of the label body if the portion of the label body is adhered to and then removed entirely from the top surface of the another portion of the label body.

12. The method of claim 11, wherein forming the security label body comprises forming an extended security label body comprising a plurality of joined security label bodies by joining the adhesive base of one security label body to the top surface of another adjacent security label body, wherein the joined security label bodies have a length that is greater than the length of either security label body.

13. The method of claim 11, wherein the length of the label body is sufficient to wrap entirely around a lateral width of the electronic device or around a corner of the electronic device.

14. The method of claim 11, wherein the electronic device comprises a smartphone, tablet computer, laptop computer, computer monitor, or television.

15. A method of using a universal, electronic device, security label, the electronic device comprising an integral camera lens on a side thereof, comprising: a plastic film security label body, the security label body comprising a plurality of layers, a top surface, an adhesive base, an end, and an opposed end, the security label body having a width and a length that is substantially greater than the width, the length configured and sufficient to wrap and adhere the adhesive base of the label body from the end, completely around a portion of the electronic device, cover the camera lens, and adhere the adhesive base of a portion of the label body in overlapping engagement with the top surface of another portion of the label body, the plurality of layers having a tamper-evident feature comprising a word and/or symbol formed within the layers along the entire length of the label body, the tamper-evident feature visible through the top surface of the portion of the label body if the portion of the label body is adhered to and then removed entirely from the top surface of the another portion of the label body, comprising:

wrapping and adhering the adhesive base of the label body from the end completely around a portion of the electronic device and covering the camera lens and adhering the adhesive base of the portion of the label body in overlapping engagement with the top surface of another portion of the label body; and securing the electronic device against removal of the security label and use of the camera, wherein subsequent removal of the portion of the label body from the top surface of the another portion and the electronic device provides an indication of removal of the portion by observation of the tamper-evident feature through the top surface of the portion.

16. The method of claim 15, further comprising subsequent checking of the electronic device and the label for visibility of the tamper-evident feature.

17. The method of claim 15, wherein the electronic device comprises an opposed second side having a second camera lens disposed thereon, and wherein wrapping the security label body also covers the second lens.

18. The method of claim 15, wherein the electronic device comprises a smartphone, tablet computer, laptop computer, computer monitor, or television.

19. The method of claim 15, wherein the security label comprises an extended security label comprising a plurality of joined security labels, each security label comprising the security label body comprising the plurality of the layers, the top surface, the adhesive base, the end, the opposed end, the width, and the length, and wherein the adhesive base of one security label body is adhered and joined to the top surface of another adjacent security label body, wherein the joined security label bodies have a joined length that is greater than the length of any one of the security label bodies.

20. The method of claim 15, wherein the length of the label body is sufficient to wrap entirely around a lateral width of the electronic device or around a corner of the electronic device.

* * * * *